United States Patent
Lin

(10) Patent No.: US 8,237,399 B2
(45) Date of Patent: Aug. 7, 2012

(54) SYSTEM AND METHOD FOR CONTROLLING CHARGING PROCESS OF AN ELECTRONIC DEVICE

(75) Inventor: Chia-Pin Lin, Tu-Cheng (TW)

(73) Assignee: Chi Mei Communications Systems, Inc., Tu-Cheng, New Taipei (TW)

( * ) Notice: Subject to any disclaimer, the term of this patent is extended or adjusted under 35 U.S.C. 154(b) by 386 days.

(21) Appl. No.: 12/547,665

(22) Filed: Aug. 26, 2009

(65) Prior Publication Data

US 2010/0253291 A1  Oct. 7, 2010

(30) Foreign Application Priority Data

Apr. 1, 2009 (CN) .......................... 2009 1 0301272

(51) Int. Cl.
*H02J 7/00* (2006.01)
*H02J 7/16* (2006.01)

(52) U.S. Cl. ........ 320/106; 320/127; 320/128; 320/132; 320/134; 320/150

(58) Field of Classification Search ................... 320/106
See application file for complete search history.

(56) References Cited

U.S. PATENT DOCUMENTS 7,589,500 B2 * 9/2009 Johnson et al. ............... 320/134
2009/0315730 A1 * 12/2009 Guthrie ...................... 340/636.1

* cited by examiner

*Primary Examiner* — Edward Tso
*Assistant Examiner* — Ahmed Omar
(74) *Attorney, Agent, or Firm* — Altis Law Group, Inc.

(57) ABSTRACT

A system and method of controlling charging process of an electronic device. The electronic device is installed with a battery and a protection circuit. The method includes setting a time interval to check a charging state of the electronic device, checking whether the battery is in an error state before a power supply charges the electronic device, and checking whether the electronic device is in an charging error state according to the time interval till the electronic device completes the charging process. When there is an abnormity, the method can output a message to a user and end the charging process using the protection circuit.

9 Claims, 3 Drawing Sheets

SYSTEM AND METHOD FOR CONTROLLING CHARGING PROCESS OF AN ELECTRONIC DEVICE

BACKGROUND

1. Technical Field

Embodiments of the present disclosure generally relate to techniques of safety charging, and more particularly to a system and method for controlling charging process of an electronic device.

2. Description of Related Art

A portable electronic device, such as a portable cell phone or a portable mp3 player, may be powered by a battery mounted therein as a power source. In order to provide enough electric power and avoid battery depletion, a user may take two or more batteries to use the electronic device. However, not of all the two or more batteries is a standard battery, and that may be secondary batteries. When the secondary batteries are charged, an electric leakage is often occurred.

What is needed, therefore, is a system and method for controlling charging process of the electronic device, so as to overcome the above-described shortcomings, and effectively and safely control the charging process.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
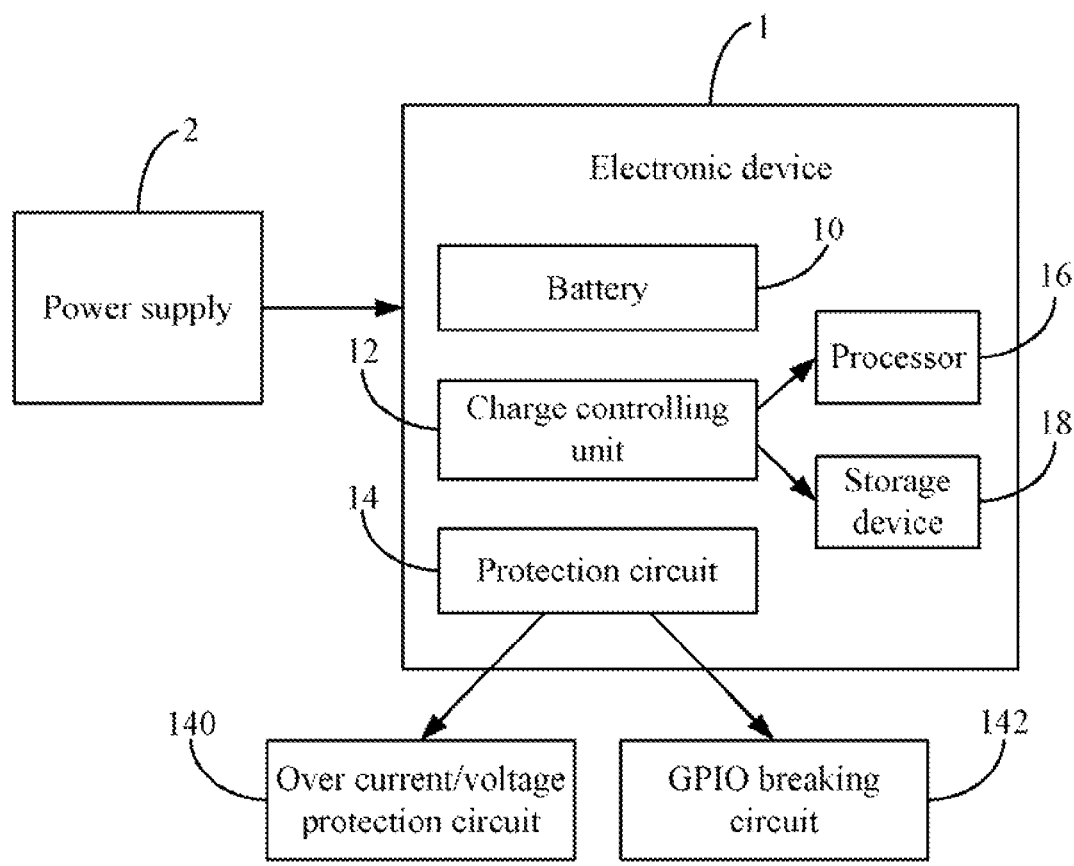
FIG. 1 is a block diagram of one embodiment of a system for controlling charging process of an electronic device.

FIG. 1 is a block diagram of one embodiment of a system for controlling charging process of an electronic device 1. The electronic device 1 may be a mobile phone, a personal digital assistant, a personal computer, or a game machine. In the embodiment, the electronic device 1 typically includes a battery 10, a charge controlling unit 12, a protection circuit 14, at least one processor 16 and a storage device 18. When a user wants to charge the electronic device 1, a power supply 2 may electronically connect to the electronic device 1. The charge controlling unit 12 is operable to control a charging process of the electronic device 1.

In one example, the charge controlling unit 12 checks whether the battery 10 is in an error state before the power supply 2 charges the electronic device 1. In another example, before the electronic device 1 completes the charging process, the charge controlling unit 12 checks whether the electronic device 1 is in an charging error state. If the battery 10 is in the error state or the electronic device 1 is in the charging error state, the charge controlling unit 1 ends the charging process and outputs a message to a user. Examples of the error state and the charging error state will be described in greater detail below. The at least one processor 16 is operable to execute one or more computerized operations of the charge controlling unit 12 that may be stored in the storage device 18. The storage device 18 may be a hard disk drive, a compact disc, a digital video disc, or a tape drive.

In the embodiment, the protection circuit 14 includes an over current/voltage protection circuit 140 and a general purpose input/output (GPIO) breaking circuit 144. The over current/voltage protection circuit 140 is operable to protect the electronic device 1 from damage when the electronic device 1 is in an over current/voltage state. The GPIO breaking circuit 144 is operable to cut off the connection between the electronic device 1 and the power supply 2 in a condition that the battery 10 is in the error state.

Figure 2:
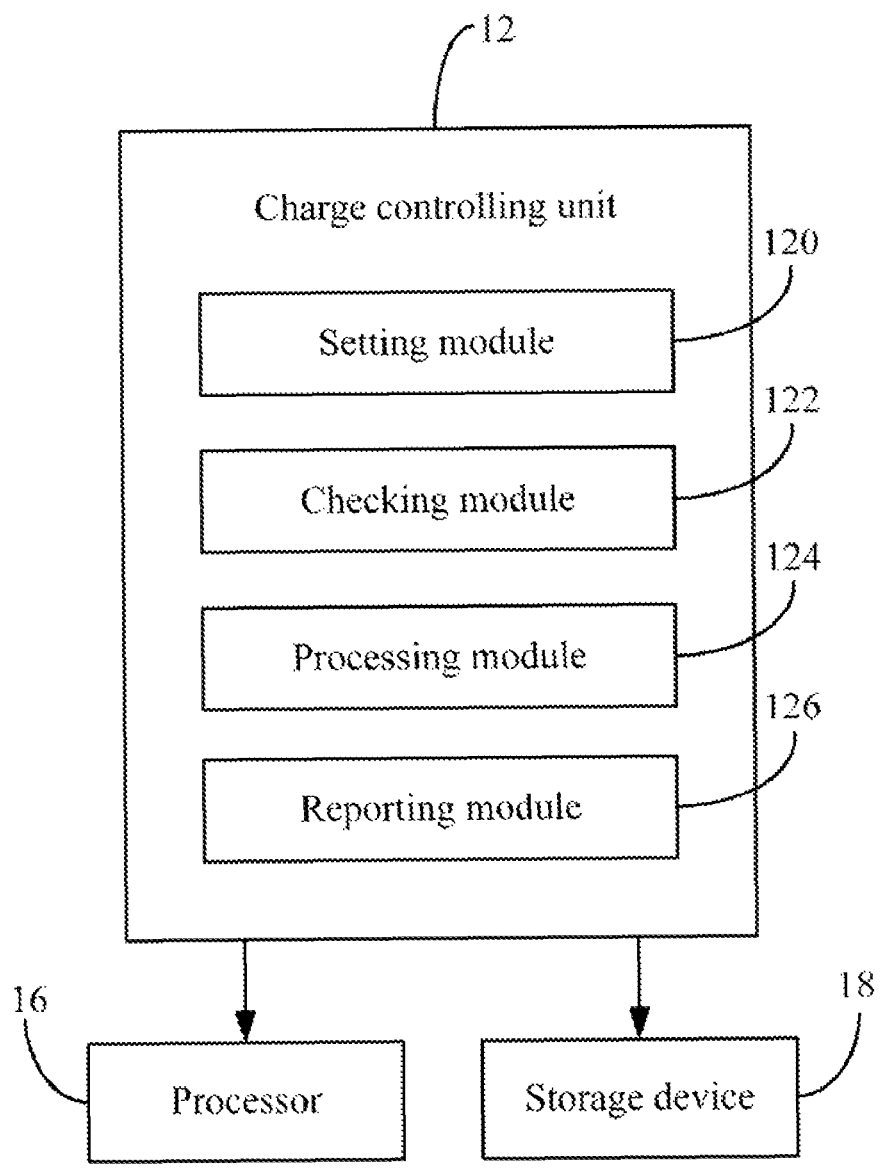
FIG. 2 is a block diagram of one embodiment of function modules of a charge controlling unit included in the system of FIG. 1.

FIG. 2 is a block diagram of one embodiment of function modules of the charge controlling unit 12 of FIG. 1. The charge controlling unit 12 may include a plurality of instructions executable by the at least one processor 16. In one embodiment, the charge controlling unit 12 may include a setting module 120, a checking module 122, a processing module 124, and a reporting module 126.

The setting module 120 is operable to set a time interval to check a charging state of the electronic device 1. In the embodiment, the time interval may be set as two seconds, a three seconds, a four seconds, and so on.

The checking module 122 is operable to check whether the battery 10 is in the error state before the power supply 2 charges the electronic device 1. In the embodiment, the error state includes that an identification (ID) of the battery 10 is error, a working temperature of the battery 10 is abnormal (such as too high), an electric current of the battery 10 is abnormal, a voltage of the battery 10 is abnormal, or electrodes connection of the battery 10 is abnormal.

If the checking module 122 checks that the battery 10 is in the error state, the processing module 124 is operable to cut off the connection between the electronic device 1 and the power supply 2 using the GPIO breaking circuit 144, and the reporting module 126 outputs a message indicating that the battery 10 is in the error state.

If the checking module 122 checks that the battery 10 is not in the error state, the power supply 2 charges the electronic device 1 and the checking module 122 checks whether the electronic device 1 is in a charging error state according to the time interval, before the electronic device 1 completes the charging process. In the embodiment, the charging error state includes that a working temperature of the battery 10 is abnormal (such as too high), a charging current of the battery 10 is abnormal, or a charging voltage of the battery 10 is abnormal.

If the electronic device 1 is in the charging error state, the processing module 124 is further operable to end the charging process, and the reporting module 126 outputs a message to the user indicating that the power supply 2 cannot continue to charge the electronic device 1. Otherwise, if the electronic device 1 is not in the charging error state, the processing module 124 controls the power supply 2 to continue charging the electronic device 1.

Figure 3:
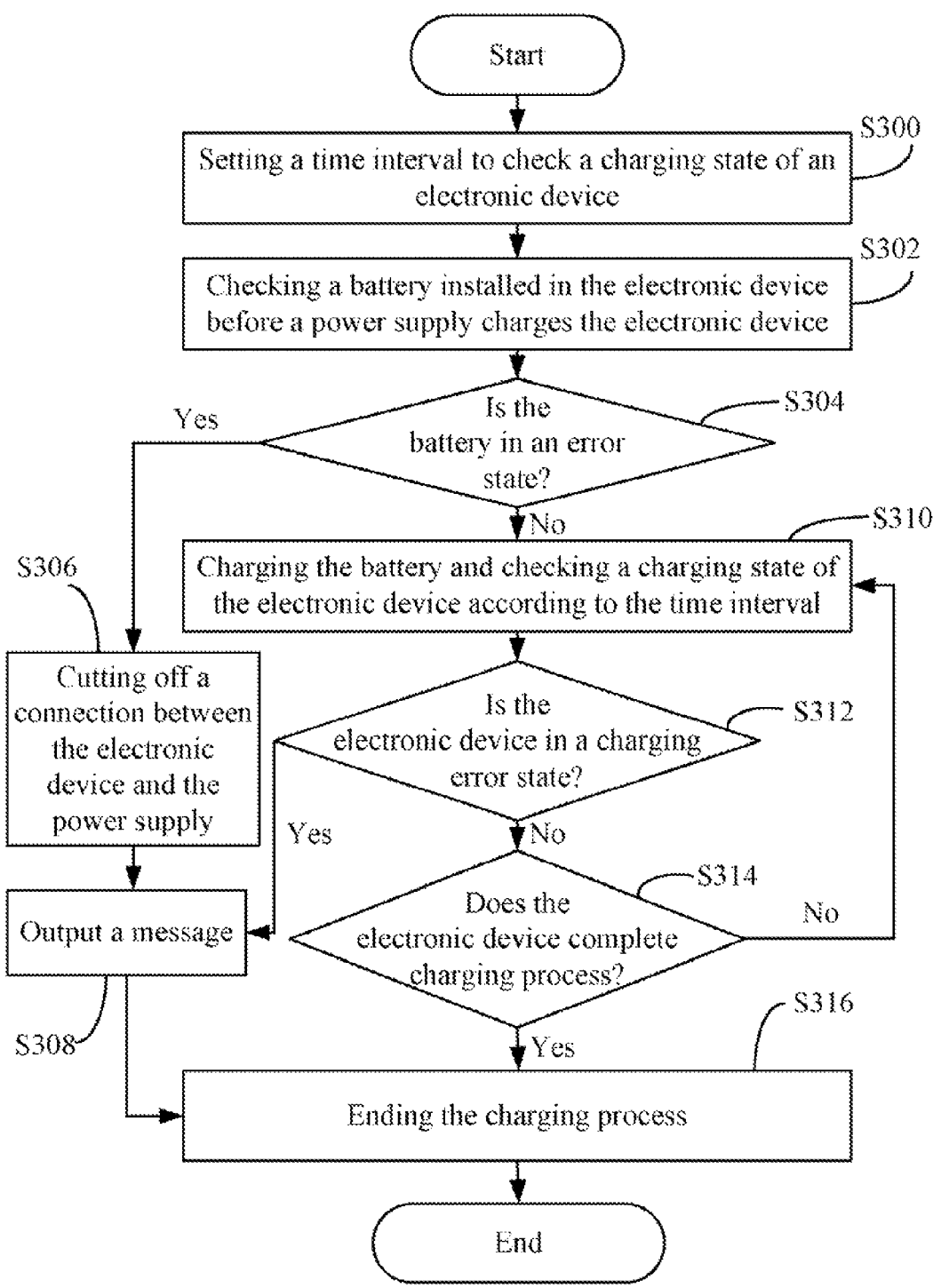
FIG. 3 is a flowchart illustrating one embodiment of a method for controlling charging process of an electronic device.

FIG. 3 is a flowchart illustrating one embodiment of a method for controlling charging process of an electronic device 1 by using the charge controlling unit 12 as described in FIG. 1. Depending on the embodiment, additional blocks in the flow of FIG. 3 may be added, others removed, and the ordering of the blocks may be changed.

In block S300, the setting module 120 sets a time interval to check a charging state of the electronic device 1. In the embodiment, the time interval may be a two seconds, a three seconds, a four seconds, and so on.

After the electronic device 1 is electronically connected to a power supply 2, in block S302, the checking module 122 checks the battery 10 before the power supply 2 charges the electronic device 1.

In block S304, the checking module 122 determines whether the battery 10 is in an error state.

If the battery 10 is in the error state, in block S306, the processing module 124 cuts off the connection between the electronic device 1 and the power supply 2 by utilizing the GPIO breaking circuit 144.

In block S308, the reporting module 126 outputs a message to a user for indicating that the battery 10 is in the error state, and the flow directly enters to block S316.

If the battery 10 is not in the error state, in block S310, the processing module 124 controls the power supply 2 to charge the battery 10, and the checking module 122 checks a charging state of the electronic device 1 according to the time interval set in block S300.

In block S312, the checking module 122 determines whether the electronic device 1 is in an charging error state according to the checking result in block S310.

If the electronic device 1 is in the charging error state, the flow returns to block S308. Otherwise, if the electronic device 1 is not in the charging error state, in block S314, the checking module 122 checks whether the electronic device 1 completes the charging process.

If the electronic device 1 does not complete the charging process, the flow returns to block S310. Otherwise, if the electronic device 1 completes the charging process, in block S316, the processing module ends the charging process.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method of controlling charging process of an electronic device installed with a battery, the method comprising:
   providing a protection circuit installed in the electronic device;
   setting a time interval to check a charging state of the electronic device;
   electronically connecting the electronic device to a power supply;
   checking whether the battery is in an error state before the power supply charges the electronic device, wherein the error state is selected from the group consisting of an error identification of the battery, an abnormal working temperature of the battery, an abnormal electronic current of the battery, an abnormal voltage of the battery, and abnormal electrodes of the battery;
   cutting off the connection between the electronic device and the power supply by utilizing the protection circuit, and outputting a message to a user if the battery is in the error state, or controlling the power supply to continue charging the electronic device if the battery is not in the error state;
   checking whether the electronic device is in a charging error state according to the time interval before the electronic device completes the charging process; and
   responding to the electronic device being in the charging error state, and outputting a message to the user and ending the charging process using the protection circuit.

2. The method as described in claim 1, wherein the charging error state is selected from the group consisting of a working temperature of the battery is abnormal, a charging current of the battery is abnormal, and a charging voltage of the battery is abnormal.

3. The method as described in claim 1, wherein the electronic device is one of a mobile phone, a personal digital assistant, a personal computer, and a game machine.

4. A storage medium having stored thereon instructions that, when executed by a processor of an electronic device, causes the processor to perform a method for controlling charging process of the electronic device installed with a battery, the method comprising:
   providing a protection circuit installed in the electronic device;
   setting a time interval to check a charging state of the electronic device;
   electronically connecting the electronic device to a power supply;
   checking whether the battery is in an error state before the power supply charges the electronic device, wherein the error state is selected from the group consisting of an error identification of the battery, an abnormal working temperature of the battery, an abnormal electronic current of the battery, an abnormal voltage of the battery, and abnormal electrodes of the battery;
   cutting off the connection between the electronic device and the power supply by utilizing the protection circuit, and outputting a message to a user if the battery is in the error state, or controlling the power supply to continue charging the electronic device if the battery is not in the error state;
   checking whether the electronic device is in a charging error state according to the time interval before the electronic device completes the charging process; and
   responding to the electronic device being in the charging error state, and outputting a message to the user and ending the charging process using the protection circuit.

5. The storage medium as described in claim 4, wherein the charging error state is selected from the group consisting of a working temperature of the battery is abnormal, a charging current of the battery is abnormal, and a charging voltage of the battery is abnormal.

6. The storage medium as described in claim 4, wherein the electronic device is one of a mobile phone, a personal digital assistant, a personal computer, and a game machine.

7. A system for controlling charging process of an electronic device installed with a battery, the electronic device connecting a power supply, the system comprising:
   a protection circuit installed in the electronic device;
   a setting module operable to set a time interval to check a charging state of the electronic device;
   a checking module operable to check whether the battery is in an error state before the power supply charges the electronic device, and check whether the electronic device is in a charging error state according to the time interval before the electronic device completes the charging process, wherein the error state is selected from the group consisting of an error identification of the battery, an abnormal working temperature of the battery, an abnormal electronic current of the battery, an abnormal voltage of the battery, and abnormal electrodes of the battery;

a processing module operable to cut off the connection between the electronic device and the power supply using the protection circuit if the battery is in the error state, and end the charging process if the electronic device is in the charging error state, or control the power supply to continue charging the electronic device if the electronic device is not in the charging error state;

a reporting module operable to output a message indicating that the battery is in the error state or the electronic device is in the charging error state; and at least one processor that executes the setting module, the checking module, the processing module, and the reporting module.

8. The system as described in claim 7, wherein the charging error state is selected from the group consisting of a working temperature of the battery is abnormal, a charging current of the battery is abnormal, and a charging voltage of the battery is abnormal.

9. The system as described in claim 8, wherein the electronic device is one of a mobile phone, a personal digital assistant, a personal computer, and a game machine.

* * * * *

UNITED STATES PATENT AND TRADEMARK OFFICE
CERTIFICATE OF CORRECTION

PATENT NO. : 8,237,399 B2  
APPLICATION NO. : 12/547665  
DATED : August 7, 2012  
INVENTOR(S) : Lin Page 1 of 1

It is certified that error appears in the above-identified patent and that said Letters Patent is hereby corrected as shown below:

On the title page, item [73] should read:

(73) Assignee: Chi Mei Communication Systems, Inc., Tu-Cheng, New Taipei (TW)

Signed and Sealed this
Twenty-ninth Day of October, 2013

Teresa Stanek Rea
*Deputy Director of the United States Patent and Trademark Office*